(12) United States Patent
Galant et al.

(10) Patent No.: US 11,166,412 B2
(45) Date of Patent: Nov. 9, 2021

(54) BALER AND METHOD OF BALING

(71) Applicant: Kuhn-Geldrop BV, Geldrop (NL)

(72) Inventors: Jean-Claude Galant, Rebrechien (FR);
Marijn Van De Laarschot, Geldrop (NL)

(73) Assignee: Kuhn-Geldrop BV, Geldrop (NL)

( * ) Notice: Subject to any disclaimer, the term of this patent is extended or adjusted under 35 U.S.C. 154(b) by 163 days.

(21) Appl. No.: 15/929,129

(22) Filed: May 14, 2019

(65) Prior Publication Data

US 2019/0261572 A1    Aug. 29, 2019

Related U.S. Application Data

(62) Division of application No. 14/238,690, filed as application No. PCT/EP2012/004278 on Oct. 12, 2012, now Pat. No. 10,349,582.

(30) Foreign Application Priority Data

Oct. 14, 2011    (GB) ..................... 1117844

(51) Int. Cl.
    *A01F 15/04*    (2006.01)
    *A01F 15/08*    (2006.01)
    *B30B 9/30*    (2006.01)

(52) U.S. Cl.
    CPC ............ *A01F 15/046* (2013.01); *A01F 15/04* (2013.01); *A01F 15/042* (2013.01); *A01F 15/0825* (2013.01); *A01F 15/0841* (2013.01); *B30B 9/3014* (2013.01); *B30B 9/3021* (2013.01); *B30B 9/3025* (2013.01)

(58) Field of Classification Search
CPC ...... A01F 15/046; A01F 15/042; A01F 15/04; A01F 15/0825; A01F 15/0841; B30B 9/3014; B30B 9/3021; B30B 9/3025
See application file for complete search history.

(56) References Cited

U.S. PATENT DOCUMENTS

| | | |
|---|---|---|
| 3,379,123 A | 4/1968 | Weltner |
| 4,172,414 A | 10/1979 | Klinner |

(Continued)

FOREIGN PATENT DOCUMENTS

| | | |
|---|---|---|
| WO | WO 80/02362 A1 | 11/1980 |
| WO | 2011 127944 | 10/2011 |

OTHER PUBLICATIONS

International Search Report dated Feb. 7, 2013 in PCT/EP12/004278 Filed Oct. 12, 2012.

(Continued)

*Primary Examiner* — Jimmy T Nguyen
(74) *Attorney, Agent, or Firm* — Oblon, McClelland, Maier & Neustadt, L.L.P.

(57) ABSTRACT

A baler including a baling chamber that includes a bale-forming channel including an inlet end and an outlet end, a plunger mounted within the channel for compressing bale material in the channel and driving the compressed bale material towards the outlet end of the channel, and a rotary drive mechanism for driving reciprocating movement of the plunger, and an additional drive mechanism for driving the compressed bale material towards the outlet end of the channel, thereby reducing torque in the rotary drive mechanism.

9 Claims, 14 Drawing Sheets

(56) References Cited

U.S. PATENT DOCUMENTS

| | | | |
|---|---|---|---|
| 4,676,153 A * | 6/1987 | Ast | B65B 13/20 |
| | | | 100/17 |
| 5,540,144 A | 7/1996 | Schrag et al. | |
| 6,101,932 A | 8/2000 | Wilkins | |
| 9,204,596 B2 | 12/2015 | Van De Laarschot | |
| 10,349,582 B2 * | 7/2019 | Galant | A01F 15/0825 |
| 2005/0016394 A1 * | 1/2005 | McDowell | A01F 15/04 |
| | | | 100/237 |
| 2005/0172838 A1 | 8/2005 | Dubois | |

OTHER PUBLICATIONS

Extended European Search Report dated May 16, 2018 in corresponding European Patent Application No. 18154724.1, 4 pages.

\* cited by examiner

BALER AND METHOD OF BALING

BACKGROUND OF THE INVENTION

The present invention relates to a baler and a method of baling, in particular but not exclusively for baling an agricultural crop.

For efficient transport and storage, agricultural products like hay, straw and silage may be compressed into bales of a parallelepiped shape, which are known as 'square' bales. After compression of the bale material the shape and the compression of the bale is maintained by binding the bale with twines that are looped around the compressed bale material. The ends of the twine are then knotted together.

Typically, compression of the bale material is performed by a reciprocating plunger press baler. A typical baler of this type is described in U.S. Pat. Nos. 4,074,623 and 4,142,746 to Hesston Corporation. This baler includes a pick-up device for picking up bale material from the ground, a feed device and a baling chamber comprising an open ended channel through which bale material is forced by a reciprocating plunger. The plunger is driven in a linear direction between a withdrawn position in front of the baling chamber and an extended position in which it extends into the baling chamber. When the plunger is in the withdrawn position the baling chamber is loaded with the bale material. The plunger is then driven into the baling chamber so that this new material is compressed against a body of compressed material already in the baling chamber. The newly compacted material is called a 'wad'. The friction of the compressed material with the walls of the baling chamber channel provides a resistive force allowing for compression of the new material that is introduced into the baling chamber in front of the plunger.

After compression, the newly compressed material and the compressed material already in the baling chamber are moved together towards the outlet end of the baling chamber until the plunger reaches its fully extended end position. The plunger then moves in the opposite direction towards its withdrawn position so that the baling chamber can be reloaded with new material to be compressed.

This process is repeated until the body of compressed material in the baling chamber has reached the required length to form a bale. The body of compressed material is then bound with twine, which is knotted by a knotter device. The whole process is then repeated to form another bale. As the new bale is formed the previously formed bale is gradually pushed towards the outlet end of the baling chamber and is eventually ejected from the chamber.

During the compression stroke, the force exerted by the plunger increases as the bale material is compressed and typically reaches a maximum value at the moment when the newly entered bale material has been compressed and the bale material already in the channel starts to shift backwards towards the outlet end of the baling chamber. The maximum value of the plunger force thus depends on the level of friction between the compressed material and the sides of the baling chamber.

The friction within the baling chamber between the compressed material and the sides of the chamber can be regulated by pressing the side panels and/or the top panel of the baling chamber against the compressed material with different levels of force. To avoid damaging the machine, the desired maximum plunger force should not exceed a set value determined by the mechanical design of the machine, but may typically range from, for example, 10% to 100% of the maximum designed plunger force depending on the required degree of compression.

Typically, the plunger is driven from a rotary drive mechanism or drive train that includes a gearbox, a drive shaft and a rotating crank. In this case the maximum plunger force of the baling machine is usually limited by the maximum allowable drive torque of the drive train, which is determined mainly by the design of the gearbox. This maximum drive torque will provide a maximum plunger force that varies with the position of the crank. In general the plunger force will be lowest when the angle between the crank and the plunger rod is approximately 90 degrees and increases as the angle approaches 180 degrees.

During a compression cycle, the force exerted by the plunger is typically at a maximum at the moment when the bale material in the channel starts to shift backward. At this moment the plunger is at a distance about equal to the wad thickness from the extended end position of the plunger. During the shifting of the compressed material the plunger force will remain at a level that is slightly lower than the maximum force. Higher plunger forces will lead to a higher level of compression and a higher density of the bales.

In practice, there is an inverse relationship between the quantity of bale material to be compressed on each compression stroke of the plunger and the maximum level of compression of the bale material and the density of the bale. If a large quantity of material is fed into the bale chamber this will result in a large wad thickness and a low level of compression, and therefore a low density. On the other hand, if a small quantity of bale material is fed into the bale chamber on each stroke this will result in a small wad thickness and a high maximum level of compression, and therefore a high density. As the throughput of the baling machine (that is, the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density.

For the economical use of trucks for transporting the bales, bales of a high density are required. However, for fast processing of the bale material, a high throughput is required. This creates a dilemma for the operator, which has to compromise on the throughput of the baler and/or the bale density. With a background art baler a higher density can only be achieved at high throughput by strengthening the gearbox, which adds to the cost of the baler.

BRIEF SUMMARY OF THE INVENTION

It is an object of the invention to mitigate at least one of the aforesaid problems. In particular, it is preferred object of the invention to provide a baler and a method of baling that reduces the torque within the drive line of the baler, thereby allowing an increase in the density of the bale without reducing the throughput or having to strengthen the gearbox.

According to one aspect of the present invention there is provided a baler comprising a baling chamber that includes a bale-forming channel having an inlet end and an outlet end, a plunger mounted within the channel for compressing bale material in the channel and driving the compressed bale material towards the outlet end of the channel, and a rotary drive mechanism for driving reciprocating movement of the plunger, wherein the baler includes an additional drive means for driving the compressed bale material towards the outlet end of the channel, said additional drive means being configured to drive the compressed bale material towards the outlet end of the channel during successive compression cycles of the plunger, thereby reducing torque in the rotary drive mechanism.

The present invention provides the advantage that the operator can select a high throughput for the baling machine, and a high level of compression, without increasing the torque in the rotary drive mechanism. This allows the machine to produce high density bales without reducing the throughput or increasing the strength of the drive train. The invention thus avoids the problems described above, which result from the fact that the plunger force varies with the position of the crank arm of the drive mechanism.

Advantageously, the additional drive means is configured to engage one or more side regions of the compressed bale material.

Advantageously, the additional drive means is configured for reciprocating movement, preferably for stepwise reciprocating movement.

Advantageously, the bale chamber comprises a plurality of panels forming the top, bottom and sides of the channel, and the additional drive means is configured to engage the compressed bale material through one or more openings in the panels.

Alternatively, the additional drive means comprises a secondary plunger configured for reciprocating movement within the baling chamber, wherein the reciprocating movement of the plunger leads the reciprocating movement of the secondary plunger and the secondary plunger is configured to extend further than the plunger into the baling chamber during a compression stroke.

Advantageously, the reciprocating movement of the plunger leads the reciprocating movement of the secondary plunger by a phase angle in the range 10 to 90 degrees, more preferably 20 to 60 degrees.

Advantageously, the plunger and the secondary plunger are configured to be driven from a single rotary drive mechanism via respective primary and secondary plunger rods.

Alternatively, they may be configured to be driven from separate rotary drive mechanisms.

Advantageously, the additional drive means is configured to drive the compressed bale material towards the outlet end of the channel between points of maximum compression force of the plunger during successive compression cycles.

Advantageously, the additional drive means is configured to drive the compressed bale material towards the outlet end of the channel by a distance equal to approximately half the wad thickness of the compressed bale material.

Advantageously, the additional drive means is configured to drive the compressed bale material towards the outlet end of the channel by a distance in the range 20-60 mm, preferably 25-40 mm.

Advantageously, the additional drive means is adjustable to adjust the distance that the compressed bale material is driven towards the outlet end of the channel Advantageously, the baler includes an adjustable friction control element comprising an adjustable panel of the bale-forming channel. Preferably the baler includes an actuator for adjusting a bias force applied to the adjustable panel.

Advantageously, the baler is an agricultural baler for baling an agricultural crop.

According to another aspect of the invention there is provided a method of baling using a square baler comprising a baling chamber that includes a bale-forming channel having an inlet end and an outlet end, a plunger mounted within the channel and a rotary drive mechanism for driving reciprocating movement of the plunger, the method comprising loading bale material into the baling chamber, compressing the bale material by driving the plunger into channel, driving the compressed bale material towards the outlet end of the channel with the plunger, and additionally driving the compressed bale material towards the outlet end of the channel with an additional drive means during successive compression cycles of the plunger, so as to reduce torque in the rotary drive mechanism.

BRIEF DESCRIPTION OF THE SEVERAL VIEWS OF THE DRAWINGS

An embodiment of the invention will now be described by way of example with reference to the accompanying drawings, wherein.

DETAILED DESCRIPTION OF THE INVENTION

Figure 1:
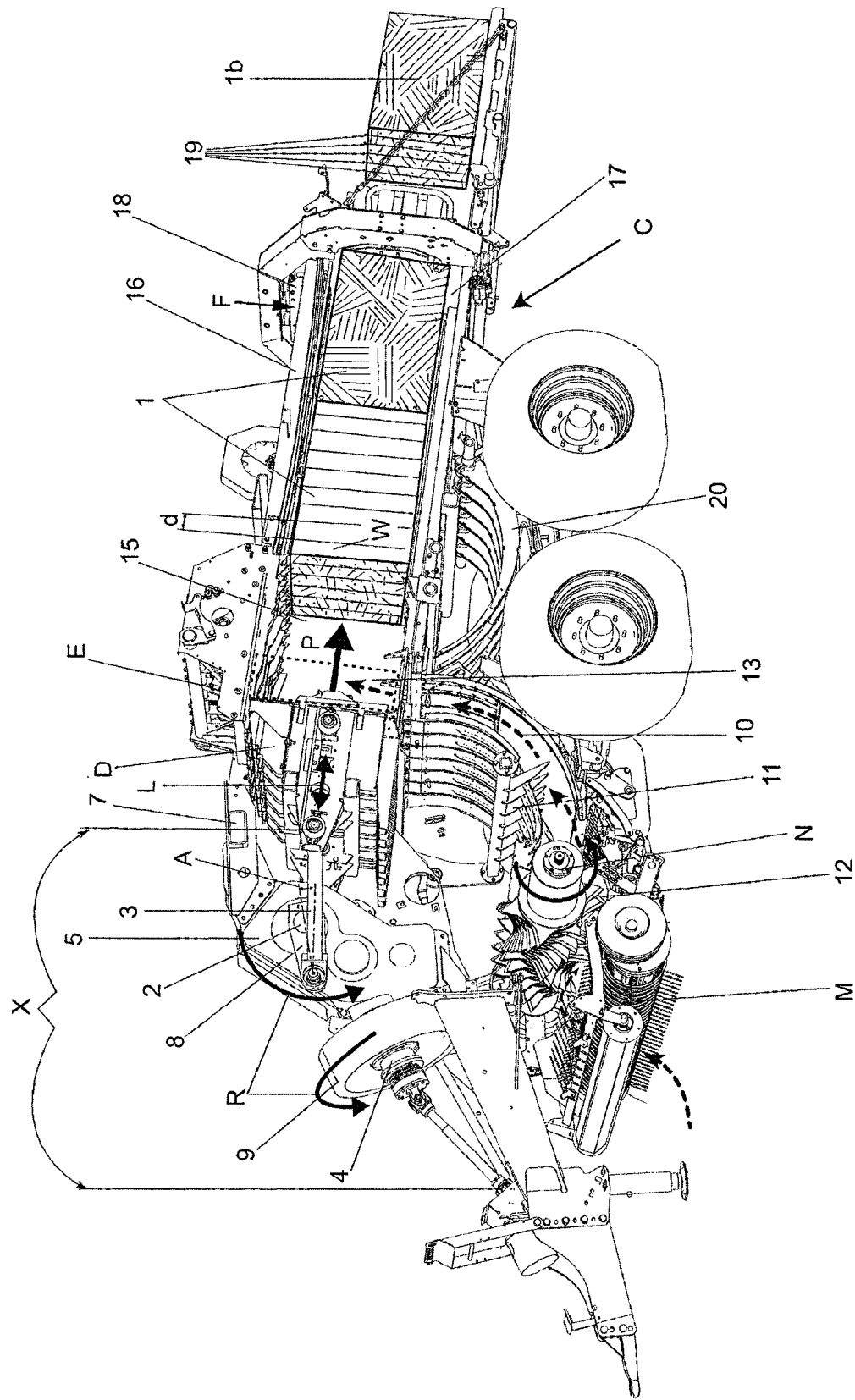
FIG. 1 is an isometric view showing the main components of a background art baling machine.
Figure 2:
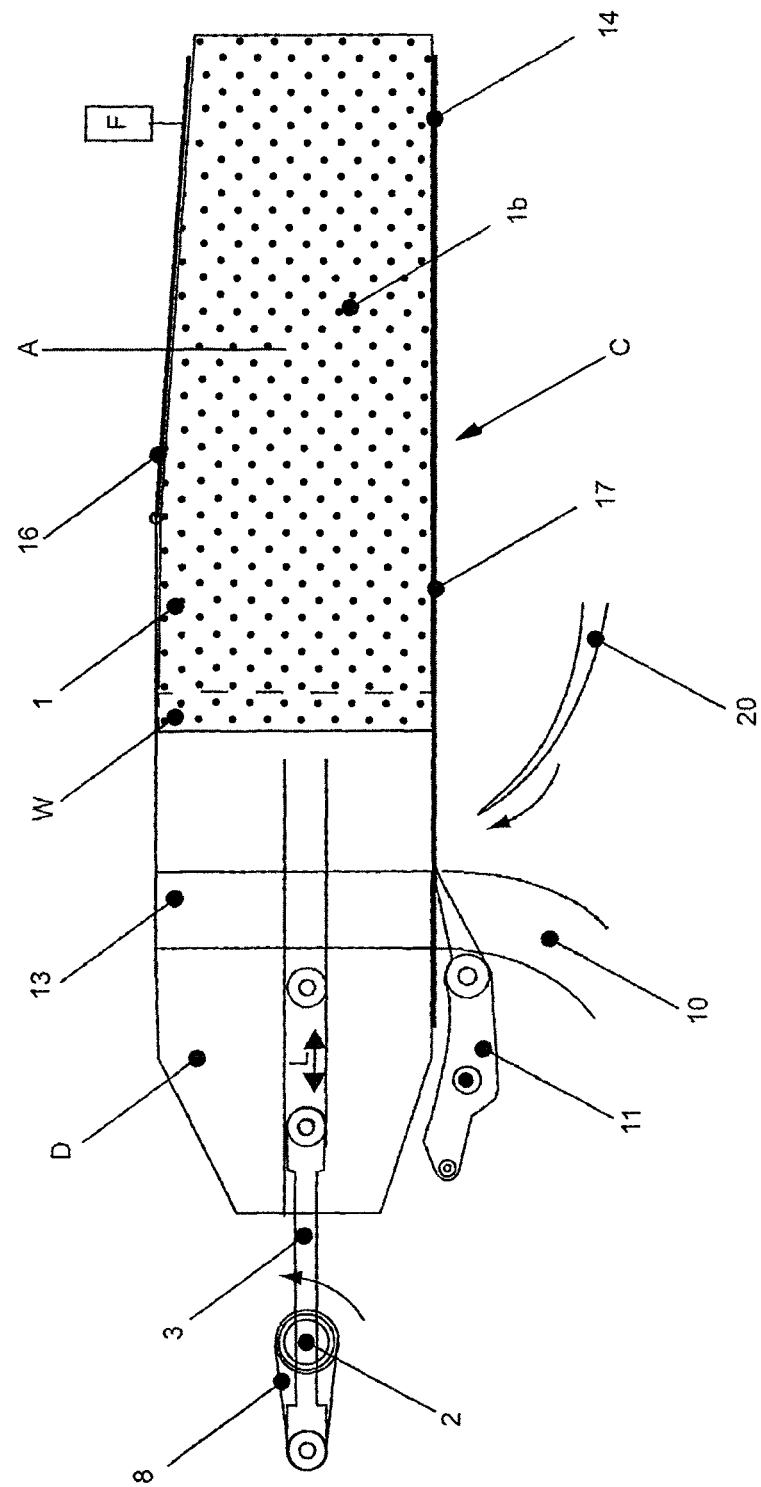
FIGS. 2-4 are schematic cross-sectional side views of the background art baler, showing the baler in three different operational positions during a baling operation.

The background art baling machine or baler shown in FIGS. 1-4 is configured to be pulled over a field and driven by a tractor (not shown). Alternatively, the baler could be self-propelled and/or self-driven.

The baler includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of a towing vehicle (not shown).

These components are all conventional and may for example be as described in U.S. Pat. Nos. 4,074,623 and 4,142,746. The baling machine also includes a binding device E for binding the bale with binding twine. This binding device may for example be as described in U.S. Pat. No. 4,074,623.

The baling chamber C comprises an open ended bale-forming channel A through which compressed bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a drive input shaft 4 through which it receives drive from the drive output of a towing vehicle (not shown). The gearbox 5 is mounted on a frame 7 of the baling machine. The drive input shaft carries a large flywheel 9 for smooth operation of the baler.

Typically the material to be baled is taken up from the ground by the pick-up device M. The feed device N feeds the material to an intermediate material buffer 10. The feed device N may be equipped with knives 12 for cutting up the material to be baled. When sufficient material has collected in the intermediate buffer 10, a stuffer 11 forwards the material into the bale chamber C in front of the plunger D. The material is then ready to be compressed.

The open ended channel A that forms the baling chamber C has an inlet end 13 and an outlet end 14. The bale-forming channel A is defined by two side panels 15 (one of which has been omitted in FIG. 1 to show the interior of the baling chamber C), a top panel 16 and a bottom panel 17. The top panel 16 (and/or one or both of the side panels 15) may comprise an adjustable panel that is pivotable about its upstream end allowing the cross-sectional area of the bale-forming channel A to be adjusted. An adjusting mechanism 18 for adjusting the position of the adjustable panel 16 is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L in the longitudinal direction of the baling chamber between two end positions comprising respectively a withdrawn position (FIG. 2) in front of the baling chamber C and an extended position (FIG. 4) in which it extends into the channel A of the baling chamber C. When the plunger is in the withdrawn position (FIG. 2) the baling chamber C is loaded with the bale material to be compressed. The plunger D is then driven into the baling chamber so that this new bale material is first shifted into contact with a body of compressed material 1 already in the baling chamber C and then compressed against that body of material. The newly compacted material forms a wad W that is added to the already compacted material 1 in the channel A. The friction of the compressed material 1 with the panels 15, 16, 17 of the baling chamber C provides a resistive force allowing for compression of the new material that is introduced into the baling chamber C in front of the plunger D.

After compression, continued movement of the plunger D drives the wad W of newly compressed material and the compressed material 1 already in the baling chamber C towards the outlet end 14 of the baling chamber until the plunger D reaches its fully extended end position. The plunger D then returns in the opposite direction to its withdrawn position so that the baling chamber C can be reloaded with new material to be compressed. The plunger therefore performs a compression cycle that consists of a compression stroke followed by a return stroke. This compression cycle is repeated continuously until the baling process is finished.

A bale 1*b* is formed from the compressed material in the baling chamber and bound with twines 19 that are looped around the body of compressed material in order to hold it in compression after leaving the baling machine. This binding process can be performed as follows.

At the start of the baling process two lengths of twine from spools (not shown) on opposite sides of the baling chamber C are connected to one another by tying the ends of the twines together using the binding device (or knotter) E. As the bale material is compacted in the baling chamber C the spools feed twine to the baling chamber C on either side of the bale material. On one side of the baling chamber C the twine passes through the tip of a baling needle 20. When the body of compressed bale material 1 has reached its full length, between two successive compressing strokes, the needle 20 brings the twine as a loop to the other side of the baling chamber C. The knotter E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Figure 3:
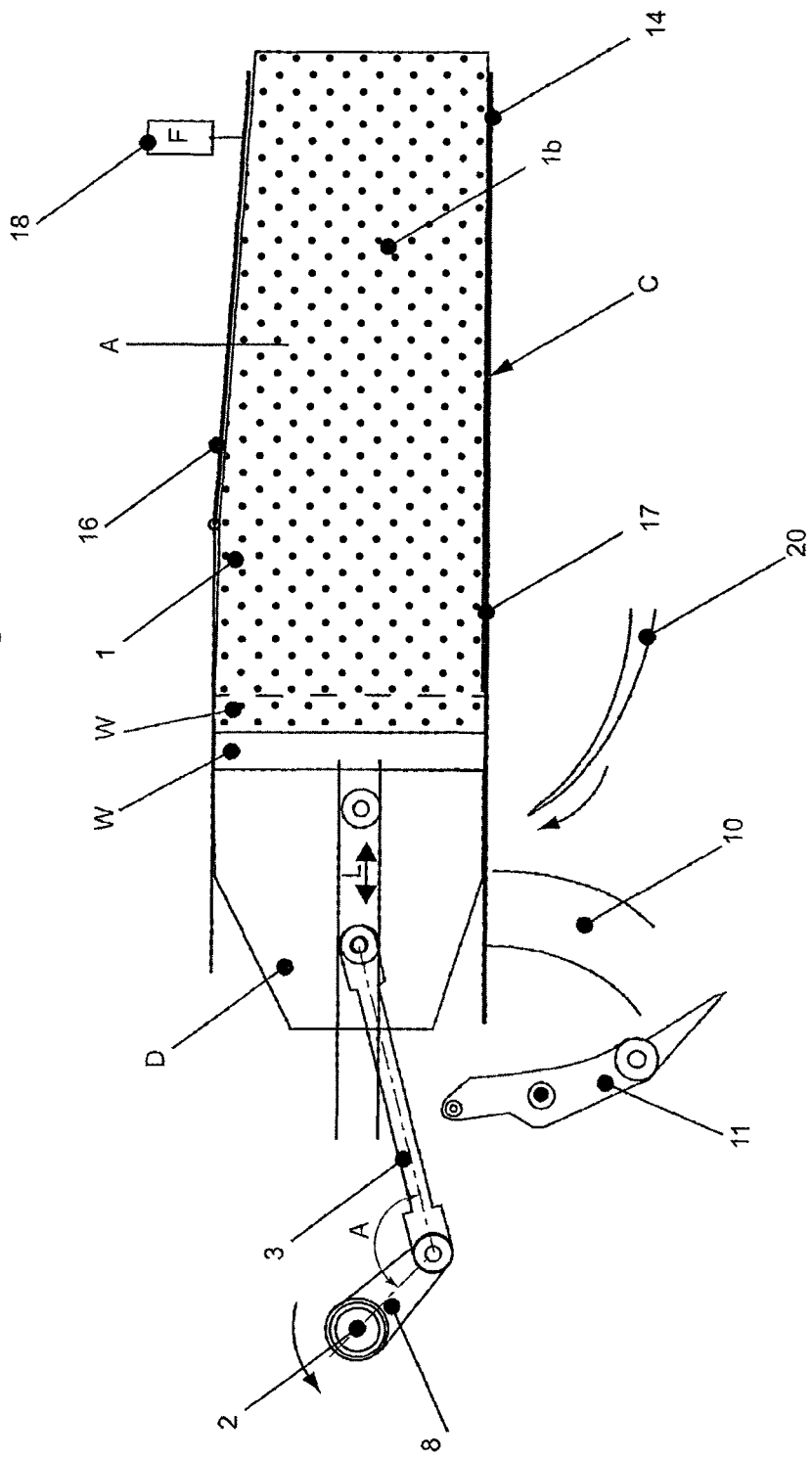
Figure 4:
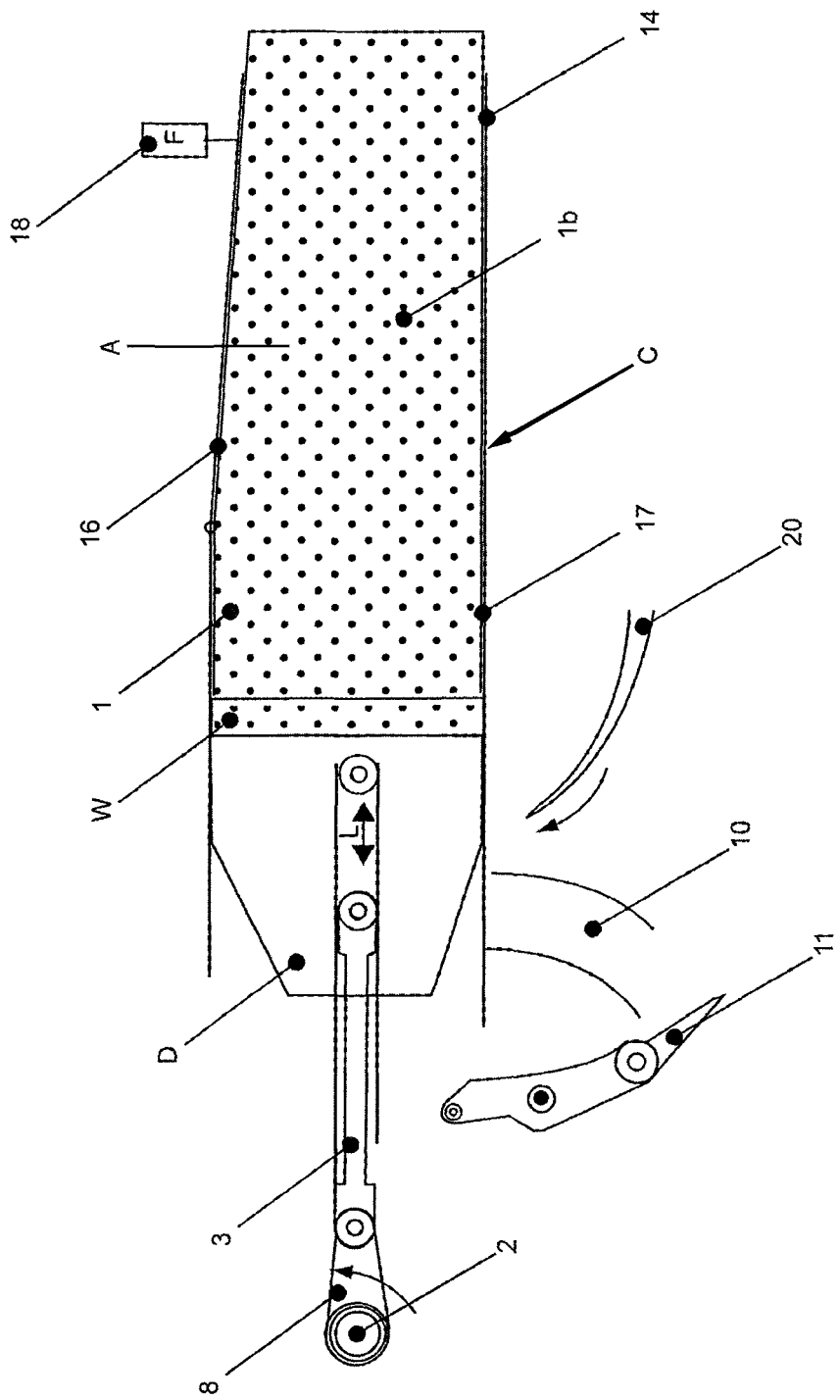

During a compression cycle, the force exerted by the plunger D is typically at a maximum at the moment when the newly fed bale material has been compressed and the bale material 1 already in the channel A starts to shift backwards (FIG. 3). At this moment the plunger is at a distance about equal to the wad thickness d from the extended end position of the plunger. During the shifting of the compressed material the plunger force will remain at a level that is slightly lower than the maximum force.

The maximum plunger force of the baling machine is limited by the maximum allowable drive torque of the drive train. This maximum drive torque will provide a maximum plunger force that varies with the position of the crank. For example, as illustrated in FIG. 3, if the gearbox 5 has a maximum drive torque of 90.000 Nm and the crank 8 has a length of 360 mm, the maximum plunger force will be about 250.000 N when the angle A between the crank 8 and the rod 3 is about 90 degrees, and about 750.000 N when the angle A between the crank and the rod is 160 degrees.

The invention describes a method and apparatus that reduces the torque required for the drive line of a baler, thereby allowing an increase in the density of the bale without having to strengthen the gearbox.

FIGS. 5-9 illustrate a baler according to a first embodiment of the invention. This baler is similar to the background art baler described above and shown in FIGS. 1-4, except as described below.

In the first embodiment of the invention, additional drive means 22 are provided within the bale channel A that engage the side regions of the compressed bale material 1 in the bale channel A. Preferably, the additional drive means 22 are located close to the inlet end 13 of the bale channel A but backward of the fully extended position of the plunger D at the end of the compression stroke.

In this embodiment, two additional drive means 22 are provided, which extend through openings in the top and bottom panels 16, 17 of the baling chamber C. Alternatively or in addition, additional drive means may be associated with the side panels 15. The additional drive means 22 could if required be integrated with one or more ejection devices for ejecting a final bale and cleaning the channel after baling of the bale material in a field has been completed.

Figure 5:
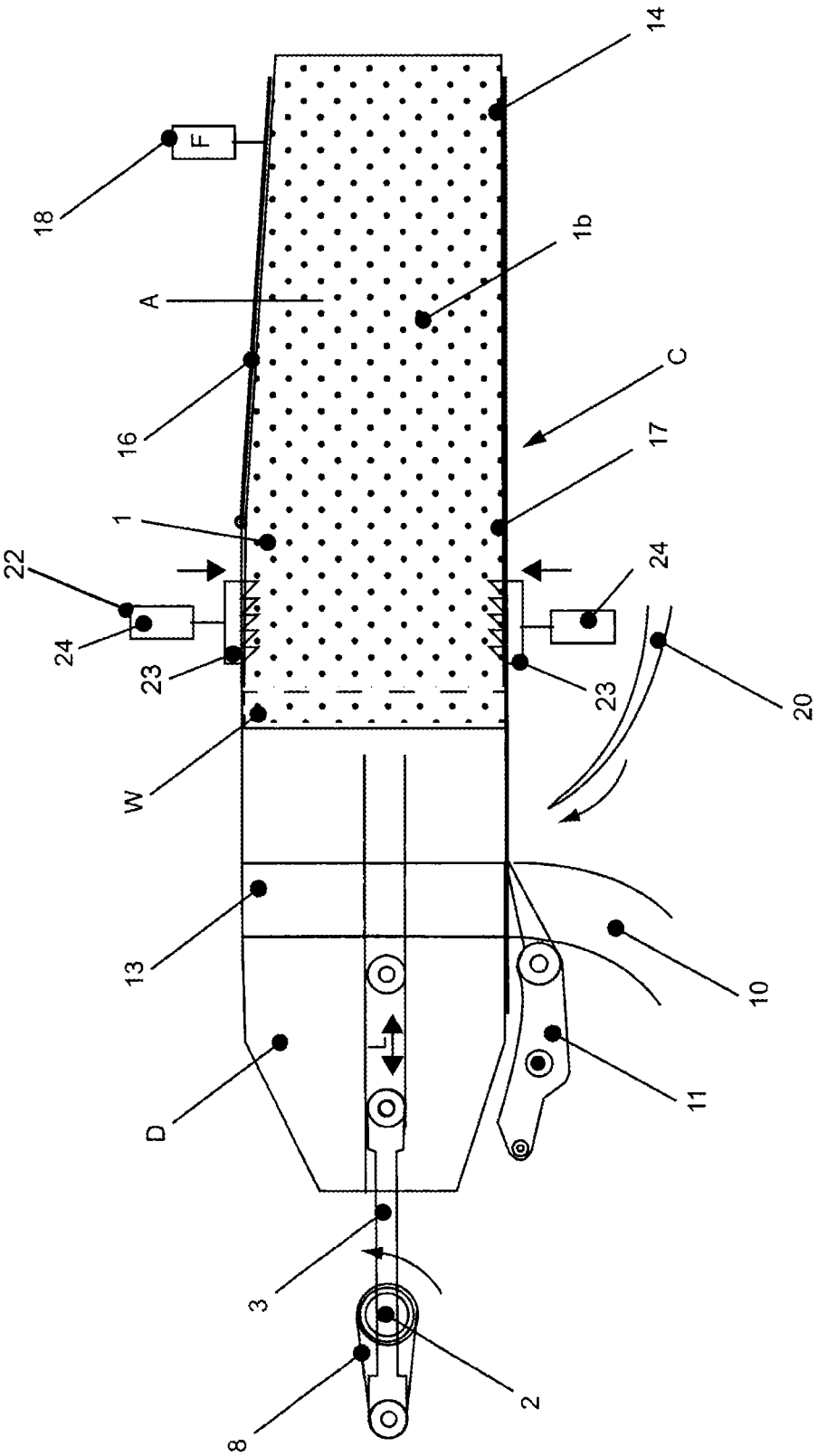
FIGS. 5-9 are schematic cross-sectional side views of a baler according to a first embodiment of the invention, showing the baler in five different operational positions.
Figure 6:
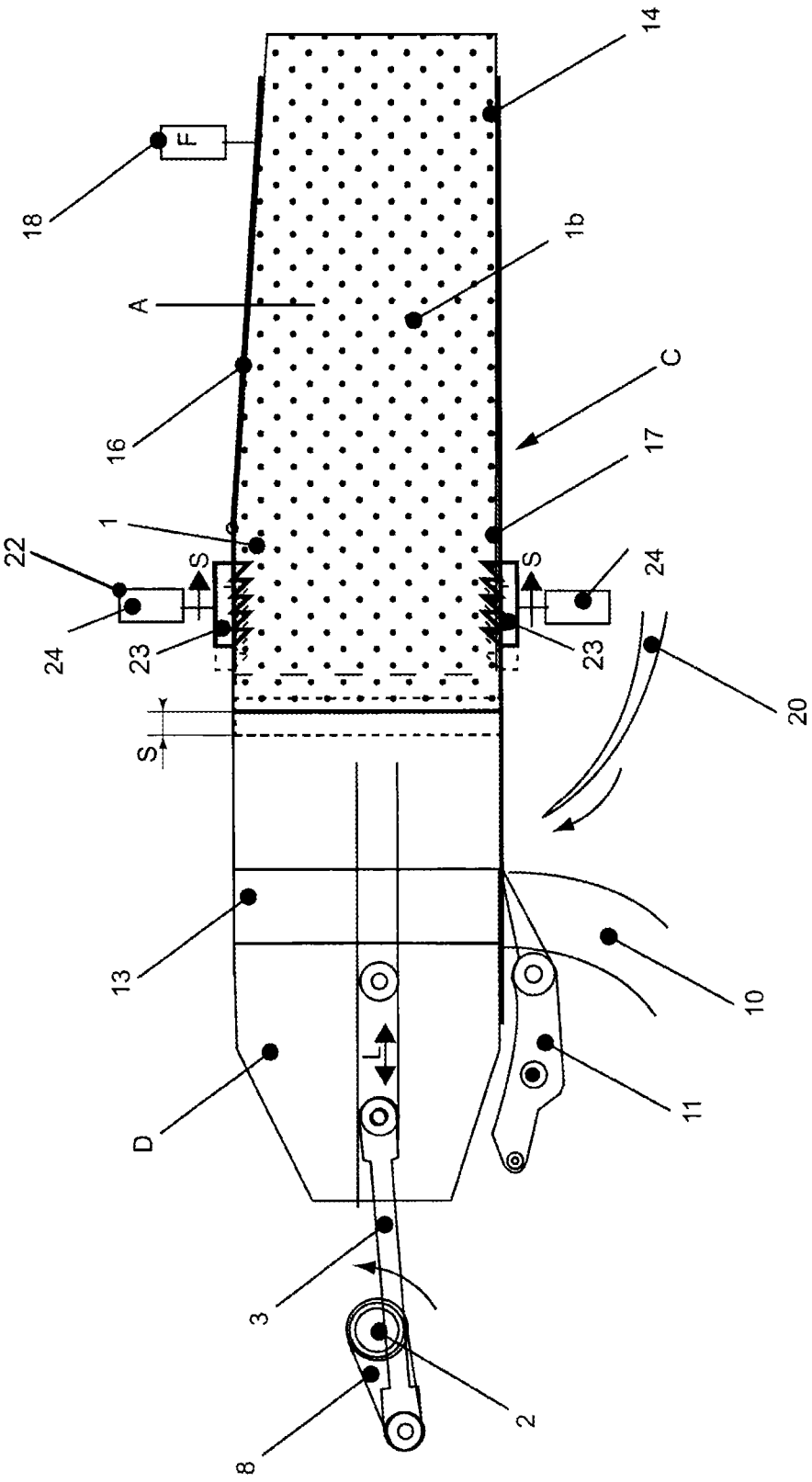
Figure 7:
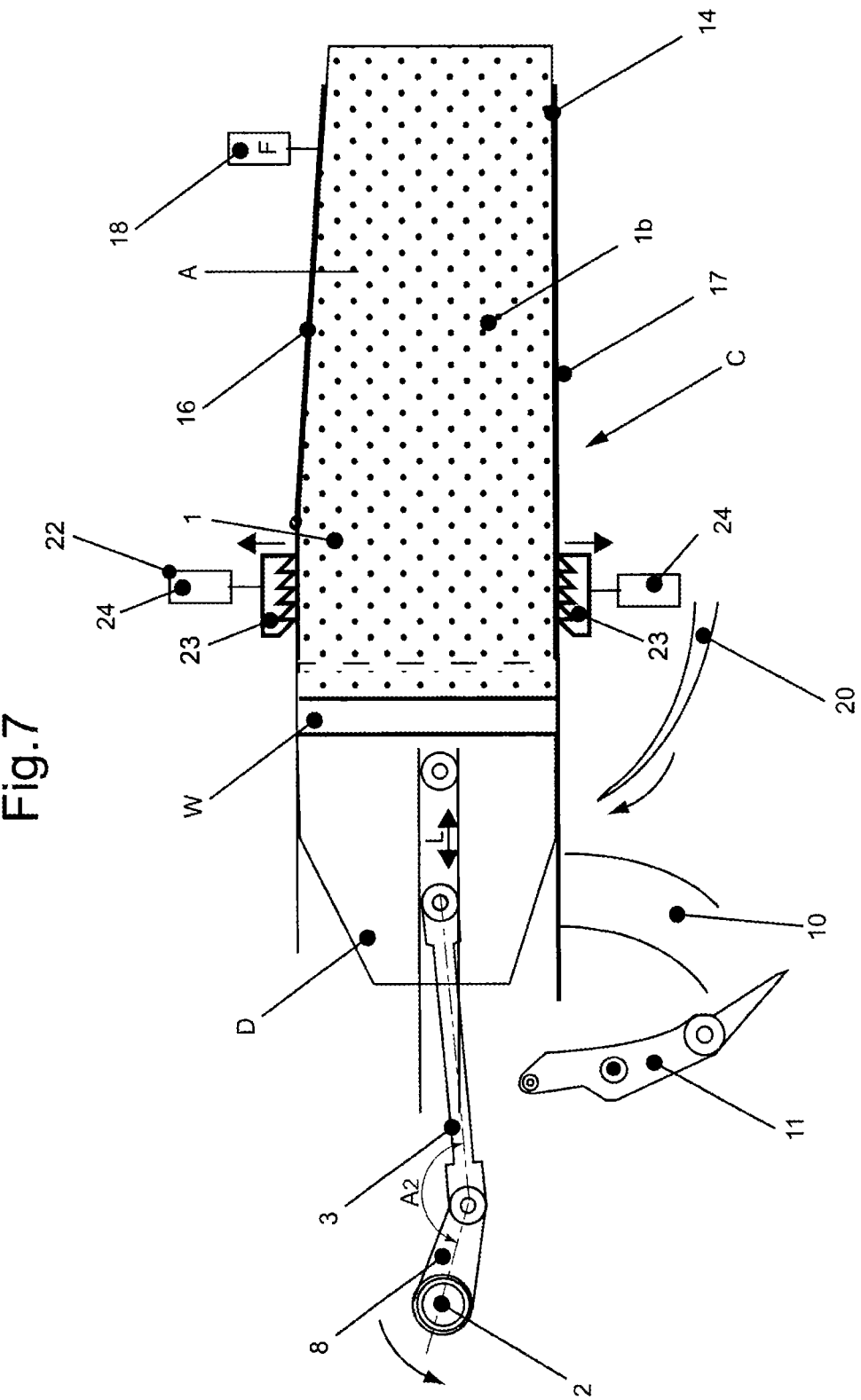
Figure 8:
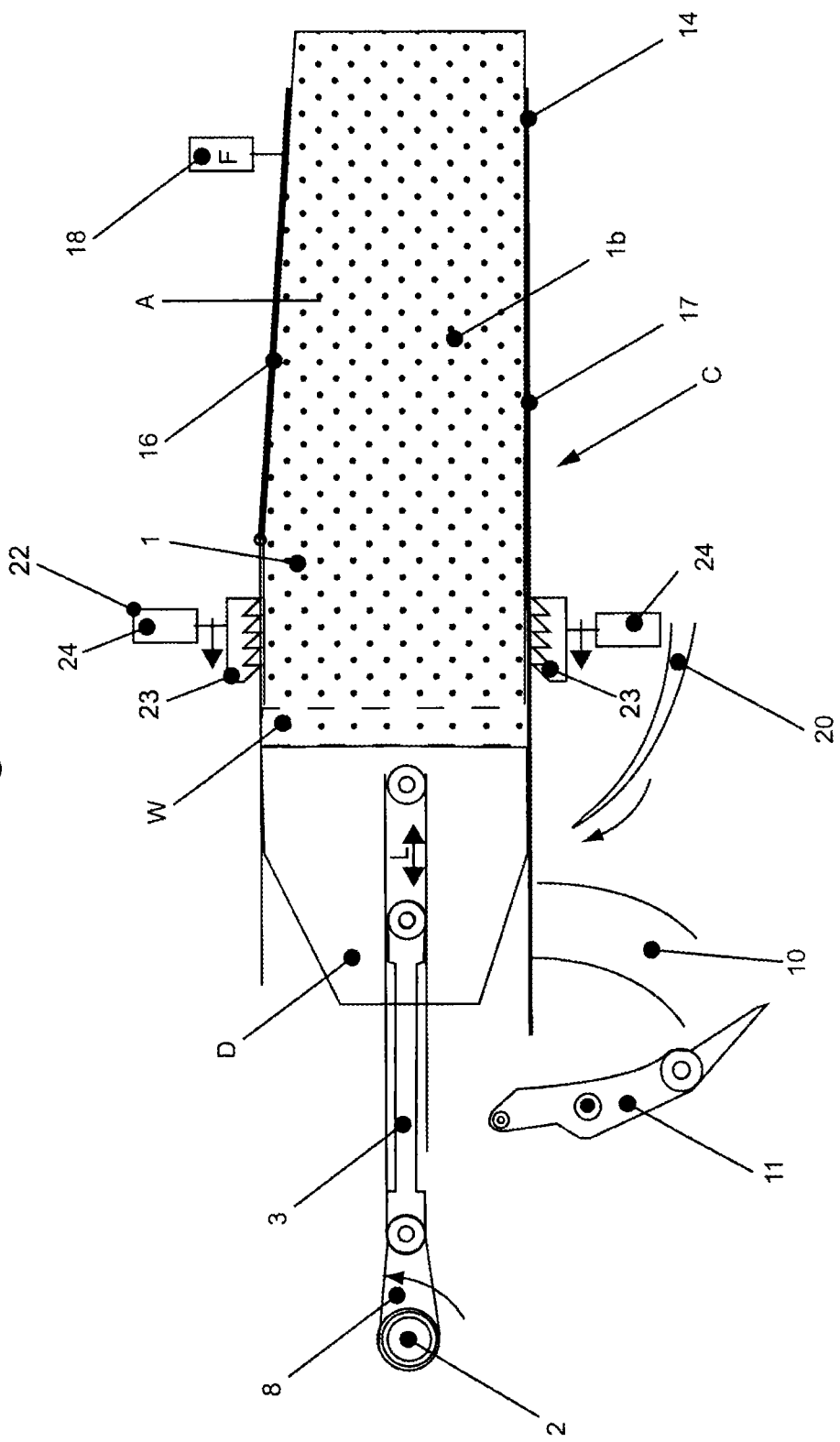
Figure 9:
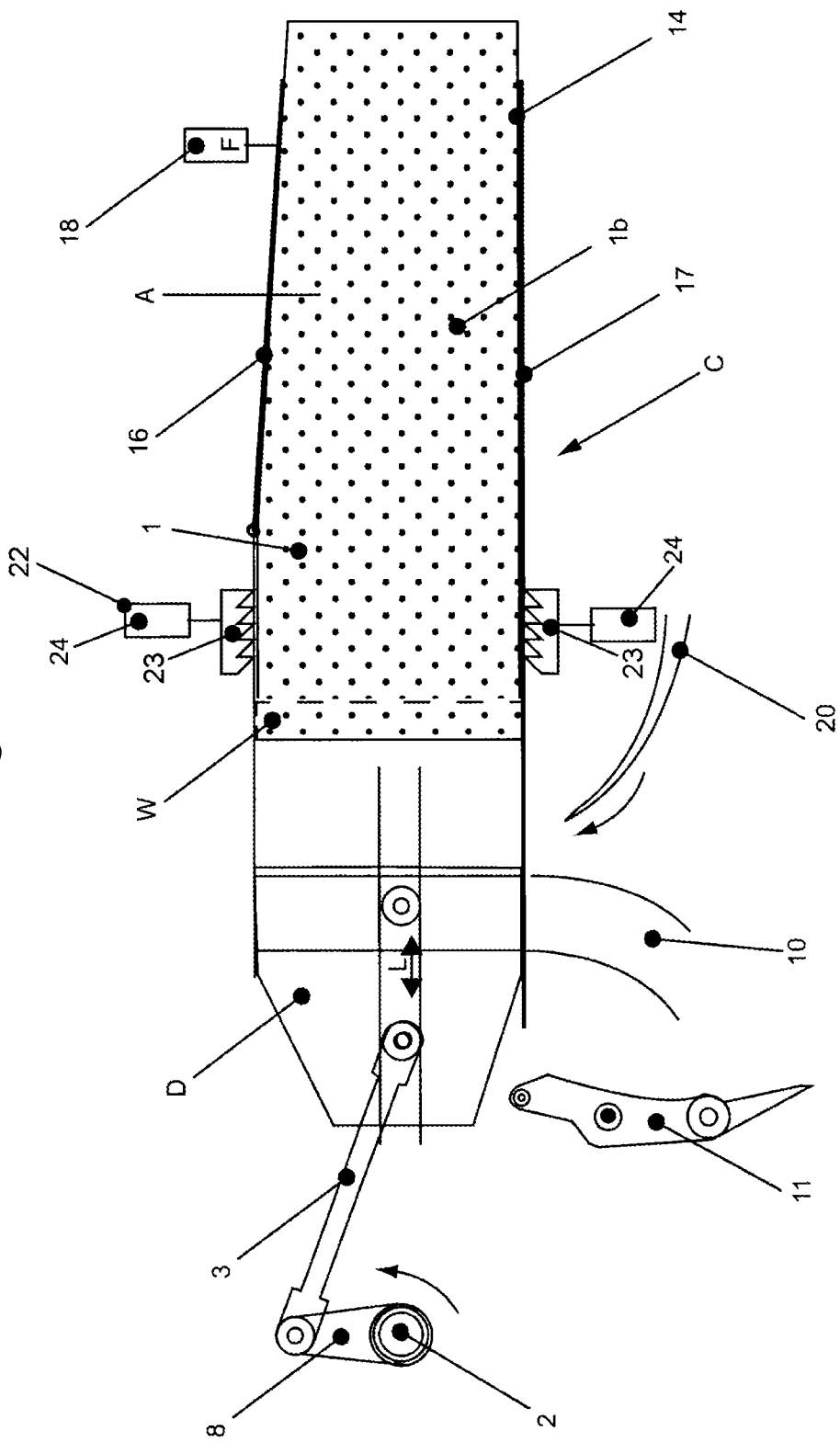

Each additional drive means 22 consists of a set of tines 23 and an actuator 24 that causes the tines 23 to reciprocate with a stepping motion in the longitudinal direction of the channel A in order to shift the compacted bale material rearward towards the outlet end 14 of the channel A. This stepping motion consists of the following movements: (i) the tines 23 are introduced transversely into the baling chamber C as shown in FIG. 5; (ii) the tines 23 are driven rearwards in the longitudinal direction S towards the outlet end 14 of the baling chamber as shown in FIG. 6; (iii) the tines 23 are withdrawn transversely from the baling chamber C as shown in FIG. 7, and (iv) the tines 23 are returned to the start position by moving them in the longitudinal direction towards the inlet end 13 of the baling chamber, as shown in FIGS. 8 and 9. The actuator 24 may for example be mechanically, electrically or hydraulically driven.

During operation, the additional drive means 22 engage the side regions of the already compressed bale material 1 in the baling chamber C. The stepping motion is coordinated with the motion of the plunger D so that the bale material is shifted rearwards by the additional drive means 22 during successive compression cycles of the plunger D. More specifically, the additional drive means 22 are configured to drive the compressed bale material towards the outlet end of the channel at a time between points of maximum compression force of the plunger D. As a result, maximum compression takes place later in the plunger stroke, when the angle A between the crank 8 and the plunger rod 3 is larger. This allows the plunger D to exert a large plunger force without exceeding the torque limit of the drive train X.

The additional drive means 22 do not act on the bale material during the final part of the plunger compression stroke when, owing to the position of the crank 8, the plunger D is able to exert a maximum compression force on the bale material without exceeding the torque limit of the drive train.

Operation of the baler is substantially as described above in relation to the background art baler shown in FIGS. 1-4, except for the use of the additional drive means 22. The operation of the additional drive means 22 during a baling operation will now be described in more detail with reference to FIGS. 5-9.

In FIG. 5 the baler is shown at the start of a compression stroke. The plunger D is in a fully retracted position, leaving an empty space at the inlet end 13 of the baling chamber C. Bale material is lifted from the intermediate buffer 10 into this space in the baling chamber C by the stuffer 11. The tines 23 have already been introduced transversely into the baling chamber C by the actuator 24.

In FIG. 6 the baler is shown during a first part of the compression stroke. The plunger D has started moving into the baling chamber C to shift the newly-introduced bale material towards the body of compressed material 1 already in the chamber. At the same time, the tines 23 of the additional drive means 22 are being driven rearwards by a distance S in the longitudinal direction L, thereby driving the compressed material 1 towards the outlet end 14 of the baling chamber. The amount of shifting (i.e. the movement) of the compressed material in the baling chamber C provided by the additional drive means 22 is preferably less than the average shifting movement produced by the plunger D during a compression stroke.

As a result of this backward shifting of the compressed bale material, compression of the newly introduced bale material against the body of compressed material does not take place until later in the compression than would have been the case with no additional shifting. Maximum compression therefore takes place at a larger value of the angle A between the crank arm 8 and the plunger rod 3. This reduces the torque in the drive train X.

In FIG. 7 the baler is shown during a final part of the compression stroke. The plunger D has moved nearly to its full extension into the baling chamber C, thus compressing the wad W of bale material in the chamber C. The tines 23 of the additional drive means 22 have been removed from the baling chamber. At this point the force applied by the plunger D is at a maximum and the compressed bale material 1 starts to slide with the completed bale 1b towards the outlet end 14. The angle A2 between the crank arm 8 and the plunger rod 3 is now very large (typically between 140 and 180 degrees), producing a large plunger force without exceeding the maximum allowed torque of the drive train.

In FIG. 8 the baler is shown at the end of the compression stroke. The plunger D has moved fully into the baling chamber C. The tines 23 of the additional drive means 22 are returning to their starting position towards the inlet end of the baling chamber. The compressed bale material 1 and the completed bale 1b have finished sliding towards the outlet end 14.

Finally, in FIG. 9 the baler is shown during the return stroke. The plunger D is moving back towards its fully retracted position and the stuffer 11 is preparing to introduce another load of bale material into the baling chamber C. The tines 23 of the additional drive means 22 are ready to be reintroduced into the baling chamber for the next compression stroke.

Because of the additional shifting S of the material in the bale channel A (FIG. 6), the maximum force for the plunger D occurs at an angle A2 (FIG. 7) between crank 8 and plunger rod 3 that is bigger than the angle A of maximum force (FIG. 3) in the background art mechanism where no additional shifting is done. As a result, less torque on the driveline of the crank is required. For comparison, FIG. 3 shows the angle A of maximum force without the additional shift produced by the additional drive means, and FIG. 7 shows the angle A2 of maximum force with the additional shift.

It should be understood that the shifting produced by the additional drive means 22 may take place at any time during the compression cycle between points of maximum compression force of successive compression strokes of the plunger. For example, the shifting may take place during a first part of the compression stroke as described above, or while the plunger is returning to its fully withdrawn position, or at any other point during the compression cycle, apart from at the time of maximum compression during the final part of the compression stroke.

The additional drive means 22 is preferably configured to drive the compressed bale material towards the outlet end of the channel by a distance equal to approximately half the wad thickness of the compressed bale material. Typically, this will be a distance in the range 20-60 mm, or more usually 25-40 mm, depending on the wad thickness. The additional drive means 22 may be adjustable to adjust the distance that the compressed bale material is driven towards the outlet end of the channel.

FIGS. 10-14 illustrate a baler according to a second embodiment of the invention. This baler is similar to the background art baler described above and shown in FIGS. 1-4, except as described below.

The baler shown in FIGS. 10-14 has a two-part plunger comprising a lower plunger D1 and an upper plunger D2. Alternatively, the plunger could be divided horizontally into left and right plunger parts. In this embodiment, the lower and upper plungers D1, D2 are driven from a common crank 8 via respective plunger rods 3a, 3b. Alternatively, the lower and upper plungers D1, D2 could be driven from separate cranks.

Owing to the arrangement of the plunger rods 3a, 3b there is a phase difference in the reciprocating movement of the two parts of the plunger during operation of the baler, which in this embodiment is equal to a phase angle of approximately 35 degrees. In this embodiment the crank 8 rotates anti-clockwise and as a result the lower plunger D1 leads and the upper plunger D2 follows. The plunger rods 3a, 3b are different in length, the upper plunger rod being longer so that at maximum extension the upper plunger D2 extends further into the baling chamber than the lower plunger D1. Alternatively or in addition the same result can be achieved by making the upper plunger D2 longer than the lower plunger D1. More generally, the following plunger is configured to extend further into the baling chamber than the leading plunger during a compression stroke.

The method of operation is similar to that of the background art baler described above and shown in FIGS. 1-4, except that the lower and upper plungers D1, D2 act in a time shifted fashion and the following plunger that comes in later in the cycle (in this example the upper plunger D2) has an end position further towards the end of the bale channel A than the end position of the leading plunger (here, the lower plunger D1). This causes the compacted bale material 1 to be shifted further towards the outlet end 14 of the bale chamber C than would have been the case in a baler having a single plunger, for example as illustrated in FIGS. 1-4.

Preferably, the end position of the following plunger is located further into the bale channel than the end position of the leading plunger by a distance equal to about half of the average compacted wad thickness T. Typically, the wad thickness is between 50 mm and 80 mm and the distance between the end positions of the leading and following plungers in the range 20-60 mm, more usually 25-40 mm. Optionally, the plunger rods 3a, 3b and/or the lengths of the plungers D1, D2 may be adjustable to adjust the distance between the end positions of the leading and following plungers.

The later-acting following plunger constitutes an additional drive means which helps to reduce the torque in the drive train. Therefore, in this embodiment the upper plunger D2 constitutes the additional drive means, which acts on the bale material to reduce the torque during compression of the bale material by the lower plunger D1. This will now be explained with reference to the sequence of operation shown in FIGS. 10 to 14.

Figure 10:
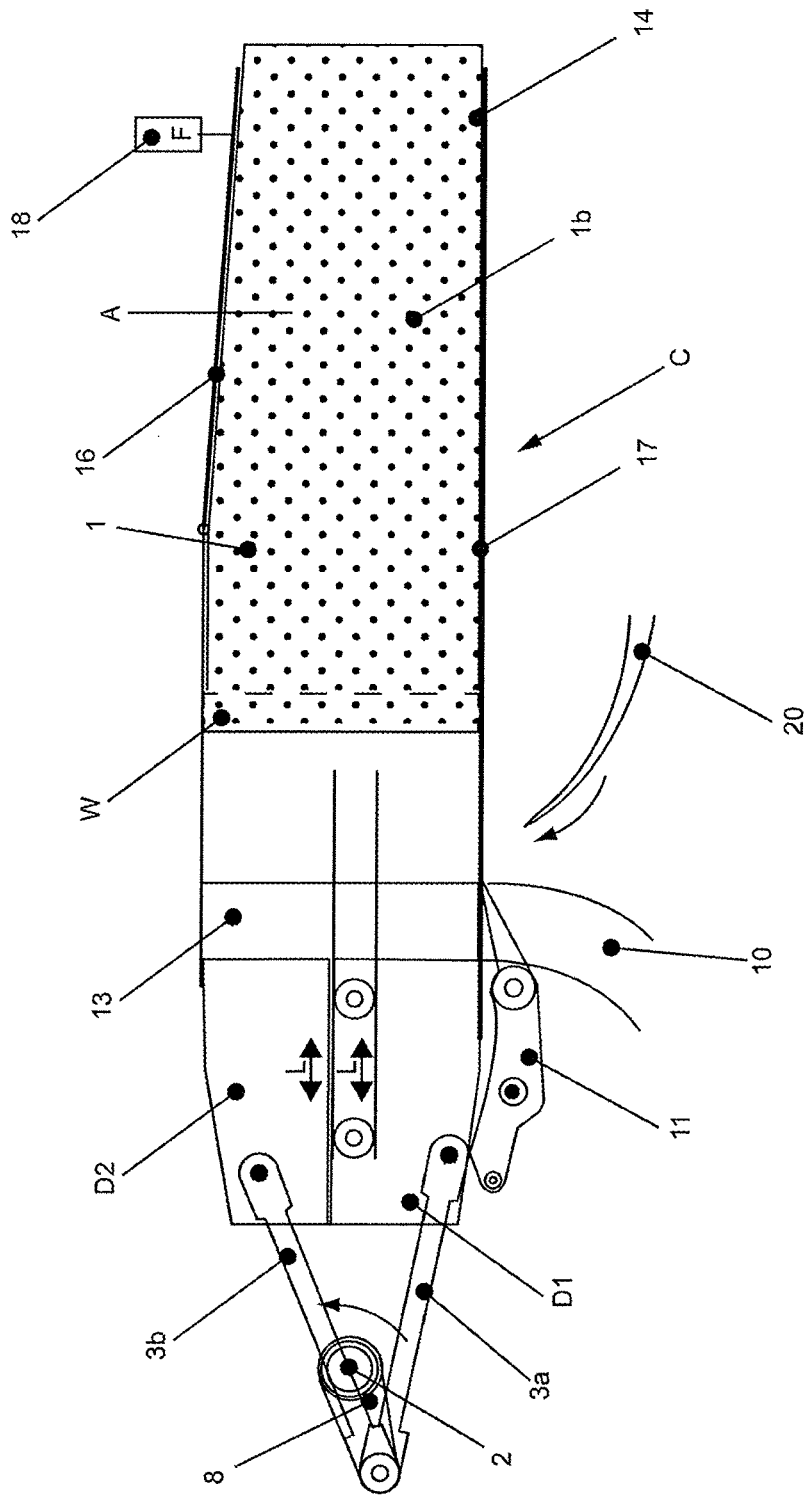
FIGS. 10-14 are schematic cross-sectional side views of a baler according to a second embodiment of the invention, showing the baler in five different operational positions.

When the lower and upper plungers D1, D2 are in their most forward (withdrawn) positions as shown in FIG. 10 the bale material to be compressed is fed by the stuffer 11 into the inlet end 13 of the bale chamber C in front of the plungers D1, D2.

Figure 11:
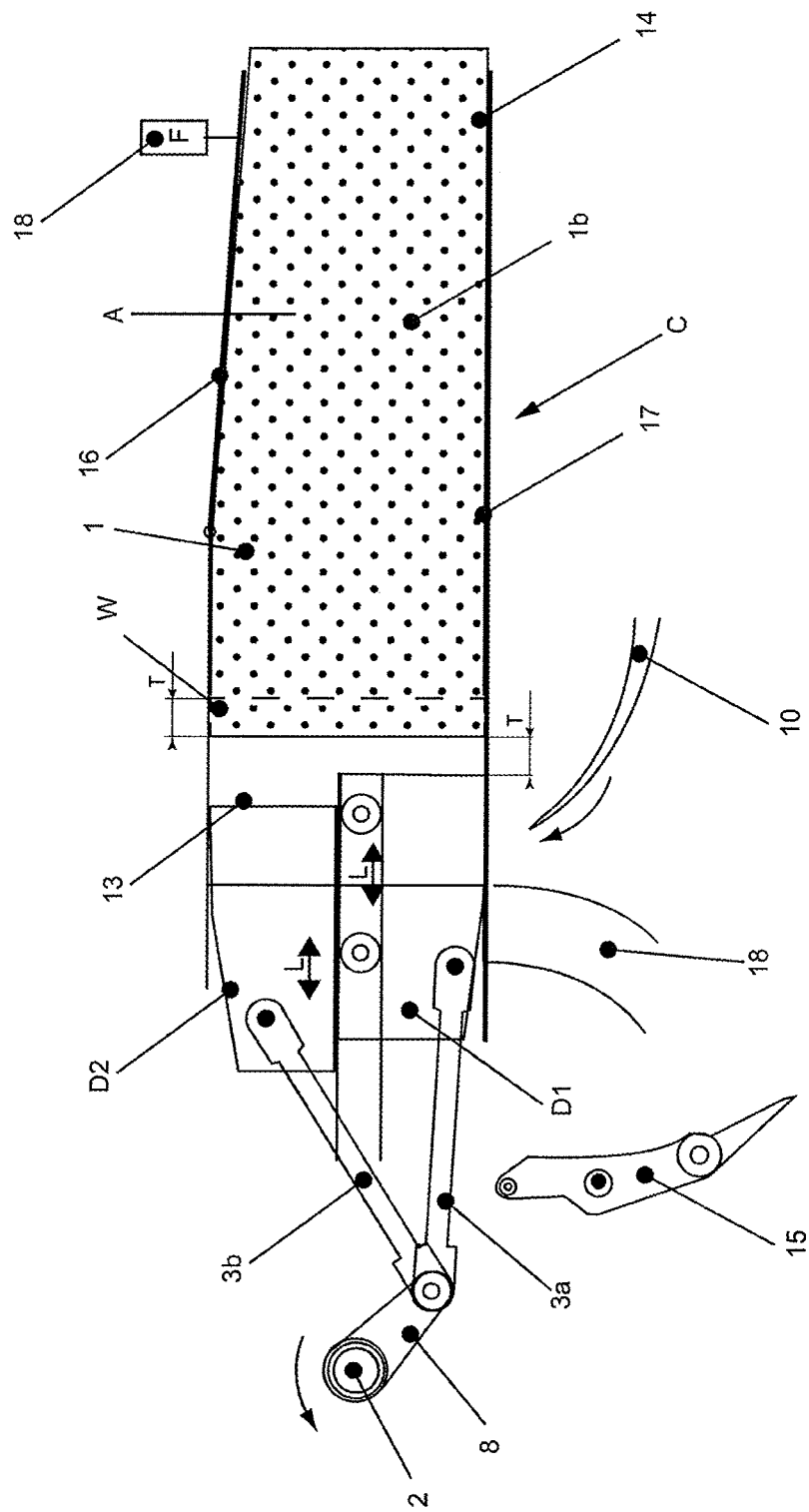

In FIG. 11 the baler is shown during a first part of the compression stroke. The lower plunger D1 and the upper plunger D2 have both started advancing into the bale chamber C, but the lower plunger D1 has advanced further than the upper plunger D2 owing to the phase difference between the plungers. The bale material in the lower part of the chamber C is thus compressed by the lower plunger D1 against the compacted bale material 1 already in the chamber C. Because the already compacted bale material is located further away than the end position of the lower plunger D1, the angle between the crank 8 and the first plunger rod 3a is bigger than it would have been if the compacted material were located at the end position of the lower plunger. Therefore the torque required for driving the earlier-acting lower plunger D1 is reduced.

Figure 12:
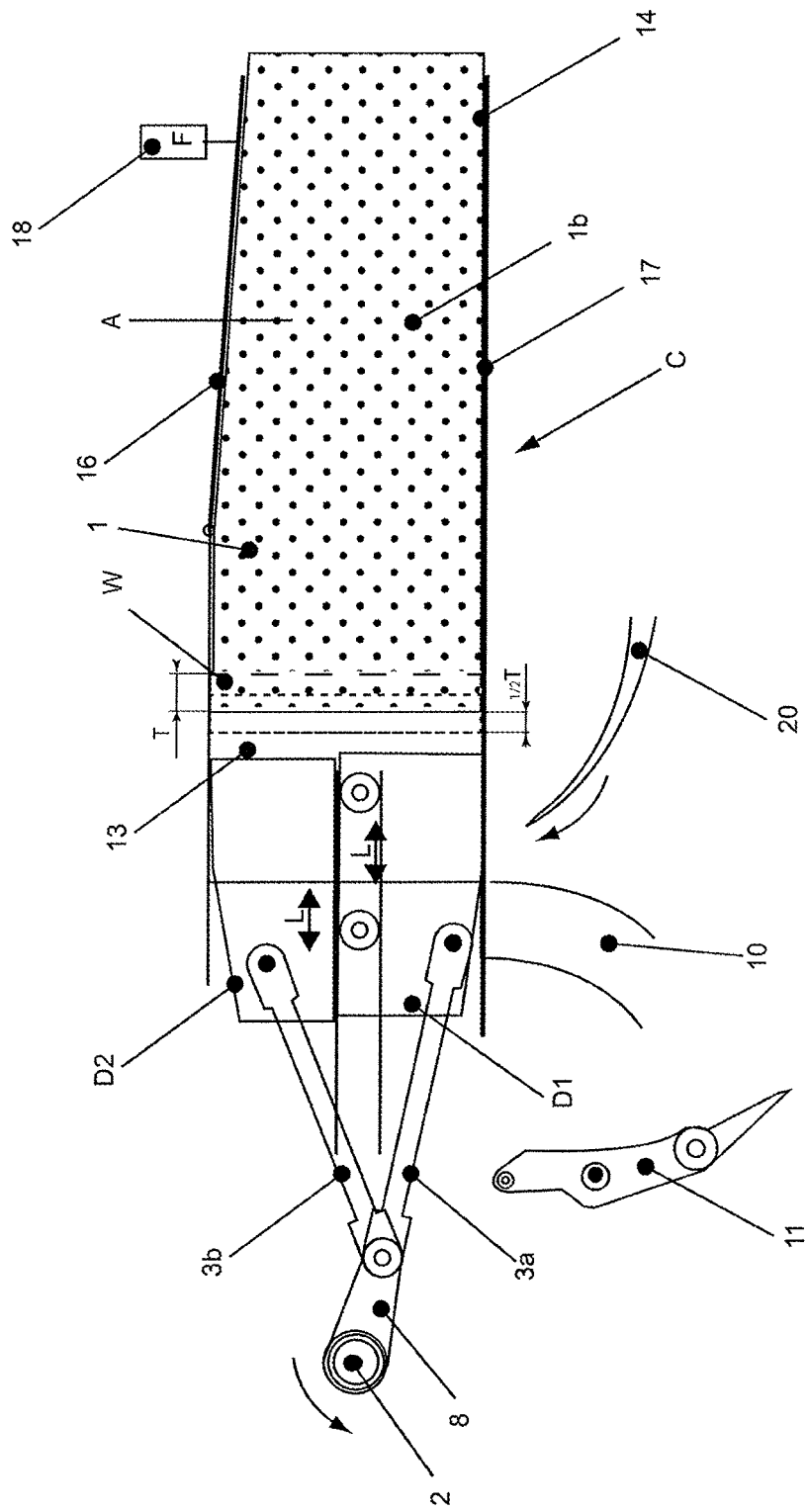

In FIG. 12 the baler is shown with the lower plunger D1 at maximum extension into the baling chamber C. The upper plunger D2 is still advancing into the chamber C and before the upper plunger D2 fully compresses the bale material in the upper part of the chamber, the lower plunger D1 shifts the newly compacted bale material and the already compacted material 1 rearwards along the bale channel A by a distance ½T.

Figure 13:
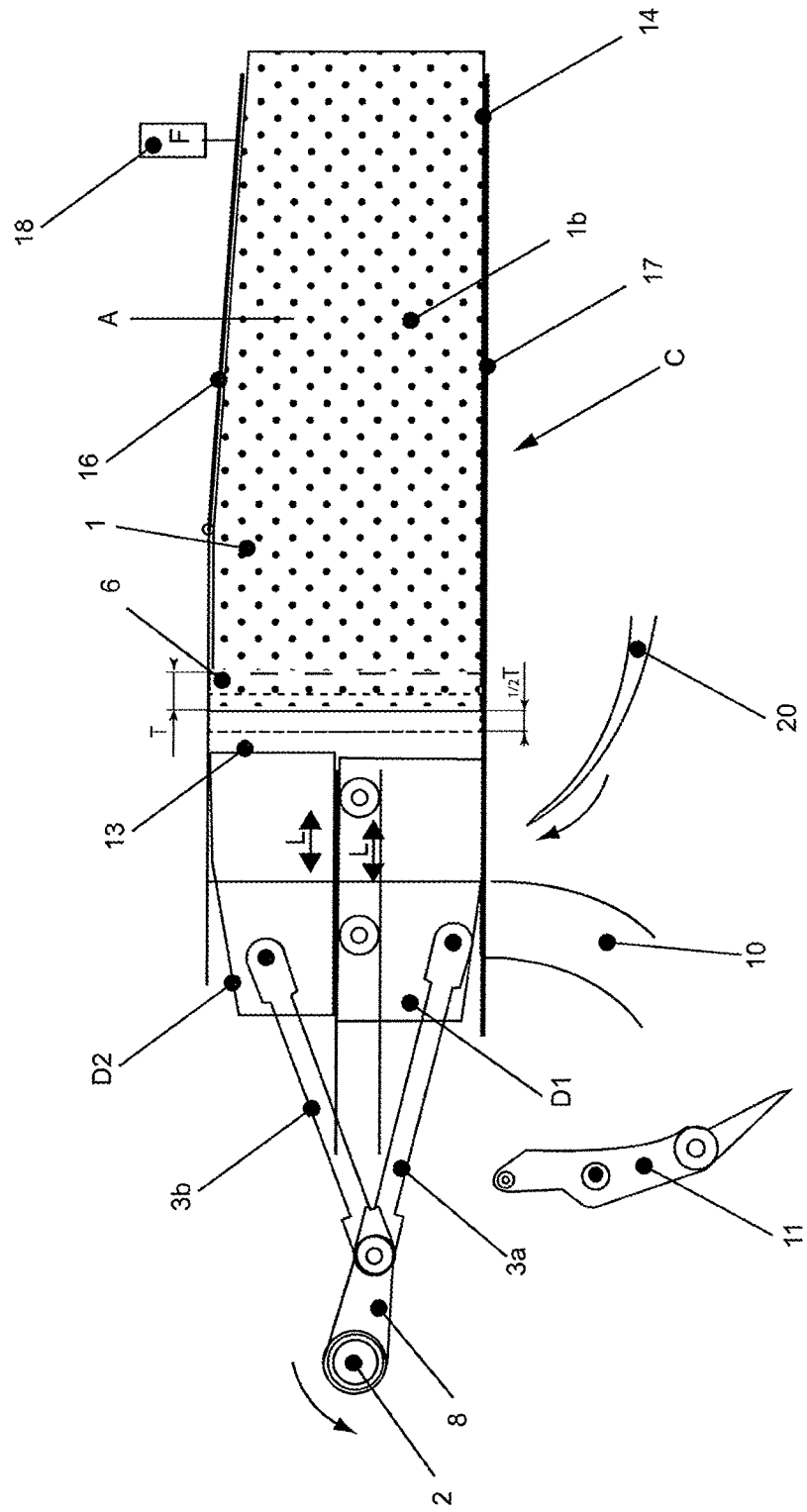

In FIG. 13 the baler is shown a little later in the compression cycle. The lower plunger D1 has started to withdraw from its maximum extension into the baling chamber C and the upper plunger D2 is still advancing into the chamber C. The later-acting upper plunger D2 further compacts the newly entered bale material against the already compacted material 1. As this material has already been shifted a distance ½T by the lower plunger D1 towards the outlet end of the channel A, the angle between the crank 8 and the plunger rod 3b at which the upper plunger D2 provides a maximum force is larger than it would have been if there was no shift produced by the lower plunger D1. Thus, the upper plunger D2 also requires a lower drive torque to provide the maximum plunger force.

Figure 14:
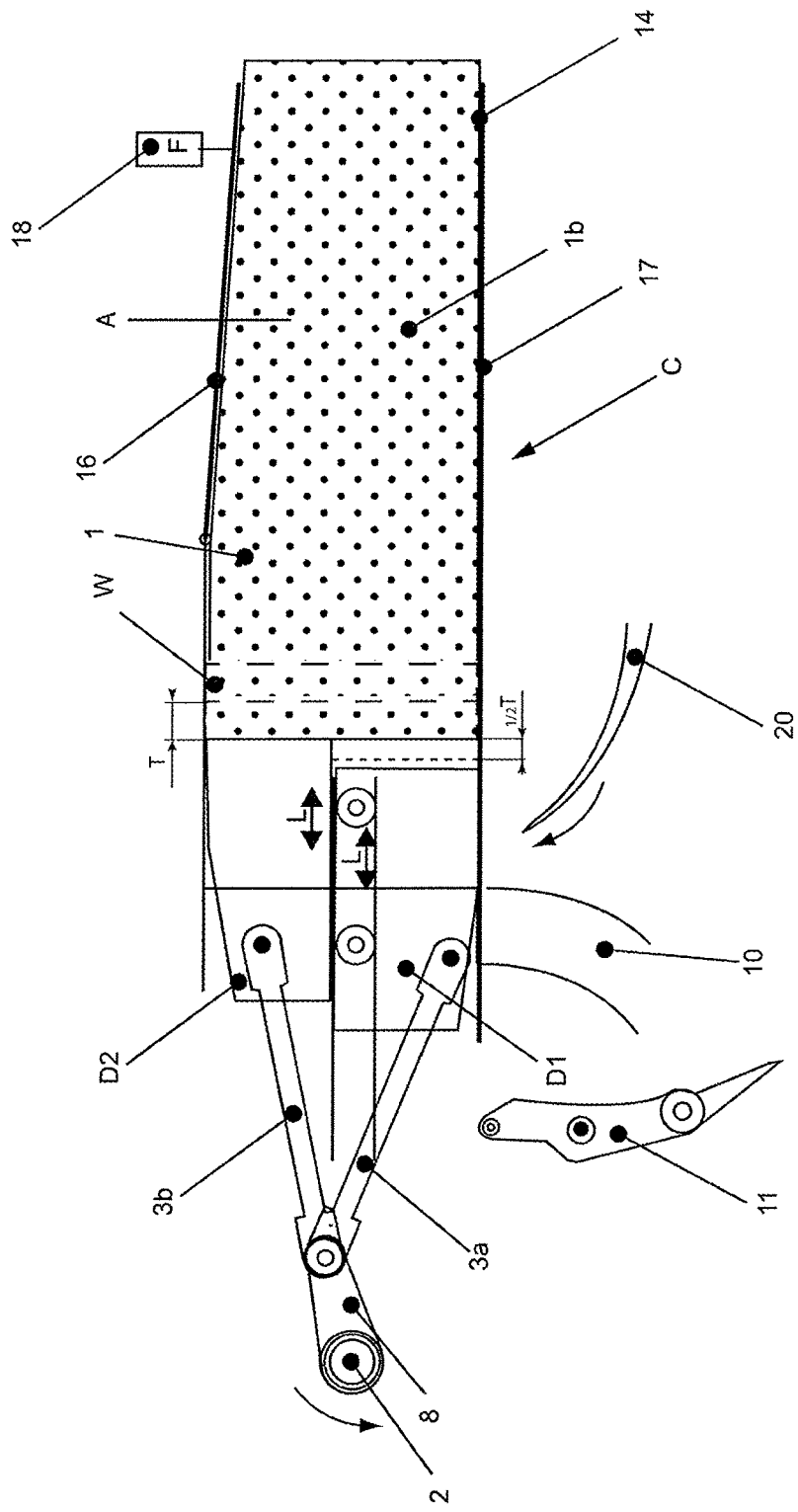

In FIG. 14 the baler is shown at the moment when the upper plunger D2 reaches maximum extension into the baling chamber C. The upper plunger D2 has shifted the compacted material 1 rearwards in the bale channel A by a further distance ½T. The lower and upper plungers D1, D2 have thus shifted the compressed bale material by a total distance T during the course of a complete compression stroke. The lower plunger D1 has retracted further from the chamber C towards the start position at the inlet end of the chamber. Both plungers D1, D2 then return to the start position shown in FIG. 10 and the cycle repeats.

A practical advantage of the invention is that the operator can choose a high throughput for the baling machine, while maintaining a high level of compression and a high density of the bales, without exceeding to torque limit of the drive train.

Various modifications of the invention are of course possible. For example, in the first embodiment shown in FIGS. 5-9 the reciprocating additional drive means 22 that engages side regions of the compressed bale material 1 may be replaced by other drive means, for example rotating rollers, wheels, chains or belts. In the second embodiment shown in FIGS. 10-14 the lower and upper plungers D1, D2 may be replaced by plungers mounted side-by-side or one within the other, for example coaxially.

The invention claimed is:

1. A baler comprising:
 a baling chamber that includes a bale-forming channel having an inlet end and an outlet end;
 a plunger mounted within the channel for compressing bale material in the channel and driving the compressed bale material towards the outlet end of the channel; and
 a rotary drive mechanism for driving reciprocating movement of the plunger to a first end position within the channel,
 wherein the baler includes an additional drive means comprising a secondary plunger for driving the compressed bale material towards the outlet end of the channel,
 wherein the secondary plunger is configured for reciprocating movement to a second end position within the channel,
 wherein the reciprocating movement of the plunger leads the reciprocating movement of the secondary plunger and wherein the second end position is located further towards the outlet end of the channel than the first end position, whereby the secondary plunger is configured to extend further than the plunger into the channel during a compression stroke, the secondary plunger being configured to drive the compressed bale material towards the outlet end of the channel during successive compression cycles of the plunger, thereby reducing torque in the rotary drive mechanism.

2. A method of baling using a baler comprising a baling chamber that includes a bale-forming channel having an inlet end and an outlet end, a plunger mounted within the channel and a rotary drive mechanism for driving reciprocating movement of the plunger to a first end position within the channel, the method comprising:
 loading bale material into the baling chamber;
 compressing the bale material by driving the plunger into channel;
 driving the compressed bale material towards the outlet end of the channel with the plunger; and additionally driving the compressed bale material towards the outlet end of the channel with an additional drive means comprising a secondary plunger during successive compression cycles of the plunger, so as to reduce torque in the rotary drive mechanism, wherein the secondary plunger is configured for reciprocating movement to a second end position within the channel, and wherein the reciprocating movement of the plunger leads the reciprocating movement of the secondary plunger and wherein the second end position is located further towards the outlet end of the channel than the first end position, whereby the secondary plunger extends further than the plunger into the channel during a compression stroke.

3. The baler according to claim 1, wherein the plunger and the secondary plunger are configured to be driven from a single rotary drive mechanism via respective primary and secondary plunger rods.

4. The baler according to claim 1, wherein the secondary plunger is configured to drive the compressed bale material towards the outlet end of the channel between points of maximum compression force of the plunger during successive compression cycles.

5. The baler according to claim 1, wherein the secondary plunger is configured to drive the compressed bale material towards the outlet end of the channel by a distance in a range of 20-60 mm.

6. The baler according to claim 1, wherein the secondary plunger is adjustable to adjust the distance that the compressed bale material is driven towards the outlet end of the channel.

7. The baler according to claim 1, including an adjustable friction control element comprising an adjustable panel of the bale-forming channel.

8. The baler according to claim 1, wherein the baler is an agricultural baler for baling an agricultural crop.

9. The baler according to claim 1, wherein the secondary plunger is configured to drive the compressed bale material towards the outlet of the channel by a distance in a range of 25-40 mm.

* * * * *